United States Patent
Ban et al.

(10) Patent No.: US 7,899,577 B2
(45) Date of Patent: Mar. 1, 2011

(54) MEASURING SYSTEM AND CALIBRATION METHOD

(75) Inventors: Kazunori Ban, Yamanashi (JP); Katsutoshi Takizawa, Tokyo (JP); Gang Shen, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 847 days.

(21) Appl. No.: 11/822,093

(22) Filed: Jul. 2, 2007

(65) Prior Publication Data

US 2008/0004750 A1  Jan. 3, 2008

(30) Foreign Application Priority Data

Jul. 3, 2006  (JP)  ................................ 2006-183375

(51) Int. Cl.
*G06F 19/00* (2006.01)
(52) U.S. Cl. ..................... 700/245; 700/248; 700/251; 700/254; 700/258; 700/259; 317/568.11; 317/568.14; 317/568.16; 317/568.19; 317/568.12; 702/85; 702/127; 702/150
(58) Field of Classification Search .................. None
See application file for complete search history.

(56) References Cited

U.S. PATENT DOCUMENTS

| | | | | |
|---|---|---|---|---|
| 4,456,961 A | * | 6/1984 | Price et al. ................ | 700/251 |
| 4,481,592 A | * | 11/1984 | Jacobs et al. .............. | 700/254 |
| 6,070,109 A | * | 5/2000 | McGee et al. ............. | 700/259 |
| 7,200,260 B1 | * | 4/2007 | Watanabe et al. ......... | 382/153 |
| 2004/0062419 A1 | * | 4/2004 | Roh et al. ................. | 382/104 |
| 2004/0093119 A1 | * | 5/2004 | Gunnarsson et al. ...... | 700/245 |
| 2005/0159842 A1 | * | 7/2005 | Ban et al. .................. | 700/245 |
| 2005/0225278 A1 | * | 10/2005 | Ban et al. .................. | 318/568.11 |
| 2005/0273199 A1 | * | 12/2005 | Ban et al. .................. | 700/248 |
| 2006/0106507 A1 | * | 5/2006 | Ledet et al. ............... | 701/23 |
| 2007/0106307 A1 | * | 5/2007 | Bodduluri et al. ......... | 606/133 |

FOREIGN PATENT DOCUMENTS

| | | |
|---|---|---|
| EP | 1 533 671 | 5/2005 |
| EP | 1 607 194 | 12/2005 |
| EP | 1 607 194 A2 * | 12/2005 |

(Continued)

OTHER PUBLICATIONS

Chinese Notification of First Office Action dated Mar. 6, 2009 issued in Chinese Application No. 2007101269443.

(Continued)

*Primary Examiner*—Khoi Tran
*Assistant Examiner*—Jonathan L Sample
(74) *Attorney, Agent, or Firm*—Drinker Biddle & Reath LLP (57) ABSTRACT

A measuring system and a calibration method for automatically calculating errors of mechanical parameters with high accuracy and correcting the parameters, by means of a relatively small and inexpensive measuring device. In relation to a plurality of positions of measurement, a robot is automatically moved such that, on a light receiving surface of a camera, the distance between the centers of an ellipse indicating a mark of a target and a circle of representing the shape of the target, and the difference between the length of the long axis of the ellipse and the diameter of the circle are within a predetermined error range.

16 Claims, 8 Drawing Sheets

FOREIGN PATENT DOCUMENTS

| | | |
|---|---|---|
| EP | 2006-110705 | 4/2006 |
| JP | 61-133409 | 6/1986 |
| JP | 04-259007 | 9/1992 |
| JP | 05-008185 | 1/1993 |
| JP | 06-241729 | 9/1994 |
| JP | 2001-038662 | 2/2001 |
| JP | 2003-230959 | 8/2003 |
| JP | 2005-201824 | 7/2005 |
| JP | 2005-342832 | 12/2005 |
| JP | 2006-110705 * | 4/2006 |

OTHER PUBLICATIONS

European Search Report mailed Nov. 25, 2009 issued in EP Application No. 07012599.2.

Japanese Notice of Reasons for Rejection mailed Mar. 4, 2008 issued in Japanese Application No. 2006-183375.

* cited by examiner

MEASURING SYSTEM AND CALIBRATION METHOD

RELATED APPLICATIONS

The present application claims priority from Japanese Patent Application No. 2006-183375, filed on Jul. 3, 2006, the entire contents of which are fully incorporated herein by reference.

BACKGROUND OF THE INVENTION

1. Field of the Invention

The present invention relates to a calibration method for mechanical parameters of an industrial multi-jointed robot and a measuring system automatically carrying out the calibration method. In particular, the invention relates to a system and a method for automatically measuring the positional relationship between a front end of a robot and the displacement of a controllable driving axis of the robot, by means of a light-receiving device capable of detecting a target or an object to be measured, and for calculating the dimension error of a mechanical unit of the robot and an error capable of being formulated, for example, elastic deformation thereof.

2. Description of the Related Art

In order to position a front end of a robot at a desired position, it is necessary to determine various parameters which specify the relationship between the position and the orientation of a front end or a hand reference point of the robot (for example, the position and the orientation of a face plate coordinate) and the angular displacement of each robot axis. However, these parameters inevitably include errors which occur during machining or assembling the robot. Further, it is difficult to directly measure these parameters of the assembled robot. Accordingly, in an industrial use, a calibration method, for measuring the relationship between the input displacement and the output displacement of the robot, and estimating the optimum value based on the measurement result so as to correct the parameters, is often utilized.

Various devices and methods regarding the calibration are known. For example, Japanese Unexamined Patent Publication No. 2001-38662 discloses a calibration method for measuring the position of a front end of a robot by fixing a three-dimensional measuring device to a stationary coordinate system. Japanese Unexamined Patent Publication No. 61-133409 discloses an automatic correction method for executing teaching in which a front end of a tool of a robot is directed to one three-dimensional arbitrary point. Also, Japanese Unexamined Patent Publication No. 4-259007 discloses a correction method for measuring the distance between a front end of a robot and one three-dimensional arbitrary point by means of a three-dimensional measuring device arranged on the front end of the robot. Further, Japanese Unexamined Patent Publication No. 6-241729 discloses a calibration method for executing teaching in which a camera for a robot may capture a target at the center of the field of vision of the camera, relational to a plurality of positions or orientations of the camera. Further, Japanese Unexamined Patent Publication No. 5-8185 discloses an automatic measurement method for calculating errors of all link elements of a robot mechanical unit, based on the difference between an imaging result and a theoretical figure, the imaging result being obtained by an imaging device arranged on a front end of the robot such that the imaging device at various postures may image a fixed point.

In order to obtain a high degree of accuracy in the conventional calibration, a highly accurate measurement is required. On the other hand, workability of calibration is also required. The measuring device disclosed in Japanese Unexamined Patent Publication No. 2001-38662 is generally large, therefore, the device is difficult to be used in a narrow working area. In the method of Japanese Unexamined Patent Publication No. 61-133409, since the teaching is manually carried out without using a measuring device, a teaching error may be generated.

On the other hand, the device disclosed in Japanese Unexamined Patent Publication No. 4-259007 or Japanese Unexamined Patent Publication No. 6-241729 is relatively small. However, the teaching of the orientation of the robot during measurement is carried out manually. Also, in Japanese Unexamined Patent Publication No. 6-241729, since only two-dimensional view lines of the camera are aligned, data obtained by one measurement operation is fewer than that obtained by using a three-dimensional measuring device. Therefore, more postures are required for the camera when imaging. In Japanese Unexamined Patent Publication No. 61-133409 and Japanese Unexamined Patent Publication No. 6-241729, since an operator is required to position the camera for measurement, the measurement result depends on the skill of the operator. In addition, since it is necessary to set a large number of teaching points in order to reduce the adverse effect of any teaching errors, the workload on the operator may be increased.

In Japanese Unexamined Patent Publication No. 5-8185, the accuracy of measurement depends on an error of the imaging device, such as the distortion of a lens. Further, the position of the fixed point to be measured must be previously known in order to carry out the automatic measurement. However, a jig or the like must be made and attached to a suitable place.

SUMMARY OF THE INVENTION

Accordingly, an object of the present invention is to provide a measuring system and a calibration method for automatically calculating errors of mechanical parameters with high accuracy and correcting these parameters, by means of a relatively small and inexpensive measuring device.

According to one aspect of the present invention, there is provided a measuring system having a light receiving device and a multi-jointed robot configured such that the light receiving device is capable of moving relative to a target to be measured, the measuring system comprising: a measurement position/orientation determining means for determining a plurality of sets of positions and orientations of the robot in which the target is captured in a field of vision of the light receiving device; a positioning means for sequentially positioning the robot at each position and orientation determined by the measurement position/orientation determining means; a target detecting means for detecting the geometrical feature of the image of the target imaged on a light receiving surface of the light receiving device; a robot moving means for moving the robot, from a start point or each position and orientation of the robot determined by the determining means, such that the geometrical feature of the image of the target on the light receiving surface of the light receiving device satisfies a predetermined condition; a terminal point storing means for storing the position and the orientation of the robot after the robot is moved by the robot moving means, as a terminal point associated with each start point; and a calculating means for calculating errors of mechanical parameters of the robot based on the position and the orientation of the robot at each terminal point stored in the terminal point storing means.

Concretely, the measurement position/orientation determining means may determine a plurality of sets of positions and the orientations such that each distance between the light receiving device and a predetermined point of the target in each of the plurality of sets is constant and the orientation of each view line of the light receiving device extending through the predetermined point of the target in each of the plurality of sets is different from each other.

Otherwise, the measurement position/orientation determining means may determine a plurality of sets of positions and orientations, such that the orientation of each view line of the light receiving device extending through the predetermined point of the target in each of the plurality of sets is constant and each distance between the light receiving device and a predetermined point of the target in each of the plurality of sets is different from each other.

The measurement position/orientation determining means may automatically determine the plurality of sets of positions and orientations of the robot.

A plurality of targets may be arranged.

The measuring system may include a plurality of light receiving devices.

The calculating means may calculate the errors of the mechanical parameters of the robot by using a non-linear optimization method including a Newton-Raphson method, a genetic algorithm method and a neural network.

A preferred example of the light receiving device is a CCD camera for obtaining a two-dimensional image. In this case, the geometrical feature of the image of the target on the light receiving surface of the light receiving device may include information representing the position of the image of the target on the light receiving surface and the distance between the light receiving device and the target. Further, the target may have a circular shape and the information includes the length of a long axis of an ellipse imaged on the light receiving surface of the light receiving device.

Another preferred example of the light receiving device is a position sensitive detector for calculating the center of gravity of the distribution of the amount of received light of the light receiving device. In this case, the target may be a light emitting body.

According to another aspect of the present invention, there is provided a calibration method of a multi-jointed robot by using a measuring system having a light receiving device and a multi-jointed robot configured such that the light receiving device is capable of moving relative to a target to be measured, the calibration method comprising the steps of: determining a plurality of sets of positions and orientations of the robot in which the target is captured in a field of vision of the light receiving device; sequentially positioning the robot at each of the determined positions and orientations; detecting the geometrical feature of the image of the target imaged on a light receiving surface of the light receiving device; moving the robot, from a start point or determined each position and orientation of the robot, such that the geometrical feature of the image of the target on the light receiving surface of the light receiving device satisfies a predetermined condition; storing the position and the orientation of the robot after the robot is moved, as a terminal point associated with each start point; and calculating errors of mechanical parameters of the robot based on the position and the orientation of the robot at each of the stored terminal points.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
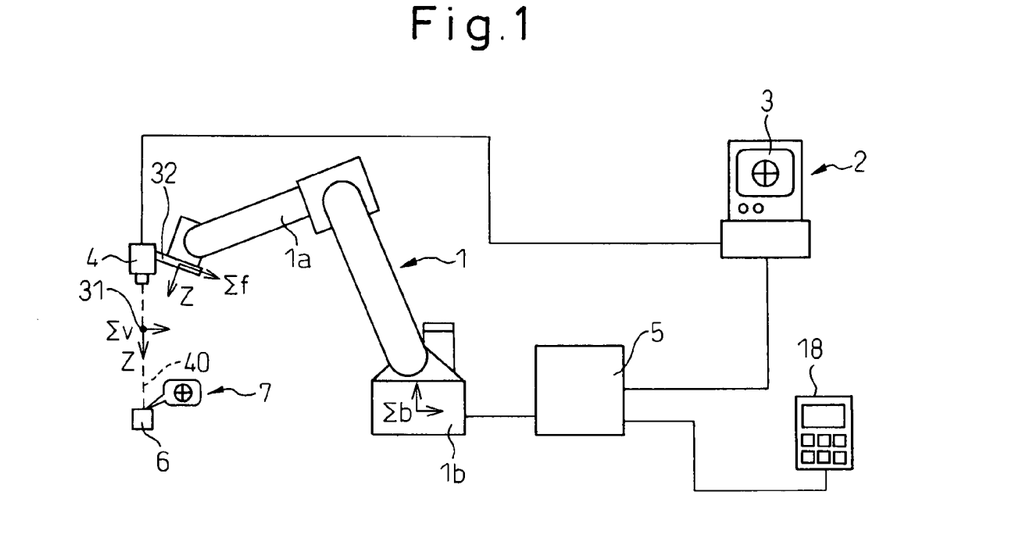
FIG. 1 is a diagram showing a schematic configuration of one embodiment according to the present invention.

The present invention will be described below with reference to the drawings. FIG. 1 is shows a schematic configuration of a measuring system according to one embodiment of the present invention. As shown in FIG. 1, a robot 1, which may be a typical multi-jointed robot having an arm portion 1a and a base portion 1b, is connected to a robot controller 5. A camera 4 is attached to a tool attachment surface 32 or a front end of the arm portion 1a. In the robot 1, a robot coordinate system $\Sigma b$ is set and fixed to the robot base portion 1b and a mechanical interface coordinate system $\Sigma f$ is set and fixed to the tool attachment surface 32. The robot controller 5 may be informed of the position of the origin and the orientation of the mechanical interface coordinate system $\Sigma f$, as needed. A teaching board 18 having a conventional manual key is connected to the robot controller 5, whereby an operator may operate the robot 1 by means of the manual key.

The camera 4 is a CCD camera, for example, which is a conventional light receiving device capable of capturing and detecting a two-dimensional image on a light receiving surface (or a CCD array) thereof. The camera 4 is connected to an image processing unit 2 having a monitor 3 such as a LCD, a CRT or the like. In the embodiment, the camera 4 may image a mark 7 on a target 6 arranged in a space represented by the robot coordinate system $\Sigma b$.

Figure 2:
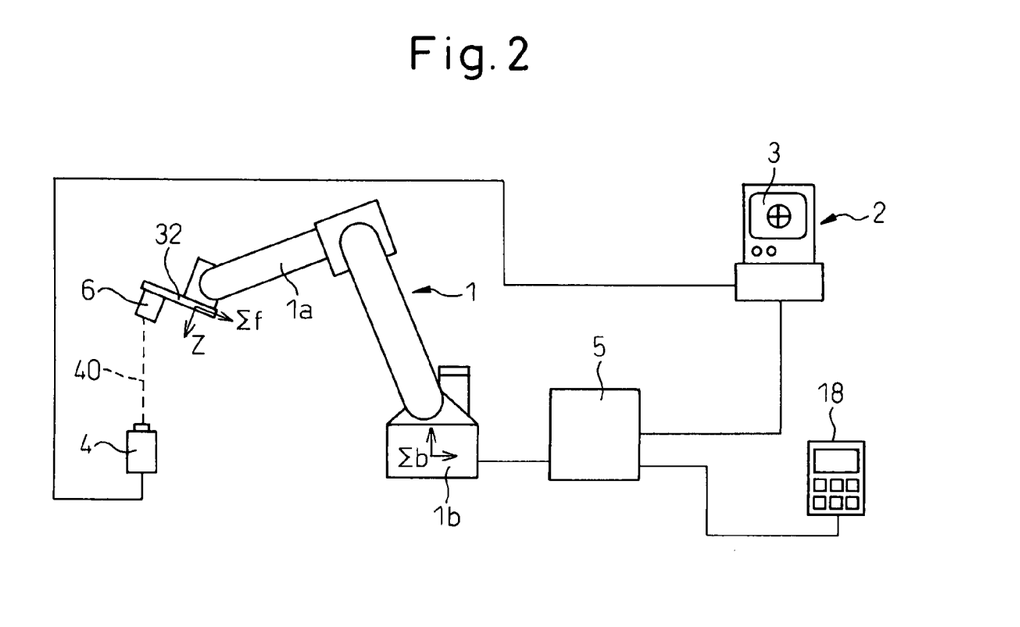
FIG. 2 is a diagram showing a schematic configuration of another embodiment according to the present invention.

On the other hand, in another embodiment of the invention as shown in FIG. 2, the target 6 may be fixed to the tool attachment surface 32 or the mechanical interface coordinate system $\Sigma f$ and the camera 4 may be arranged in a space represented by the robot coordinate system $\Sigma b$. In this way, the light receiving device and the target may be relatively freely arranged. Further, since the positional relationship between the light receiving device and the target may be automatically and precisely adjusted as described below, it is not necessary to control the accuracy regarding the arrangement of the light receiving device and the target. Since the procedure of measurement in the system of FIG. 2 may be the same of that of FIG. 1, the explanation below is related to the system of FIG. 1.

Figure 3:
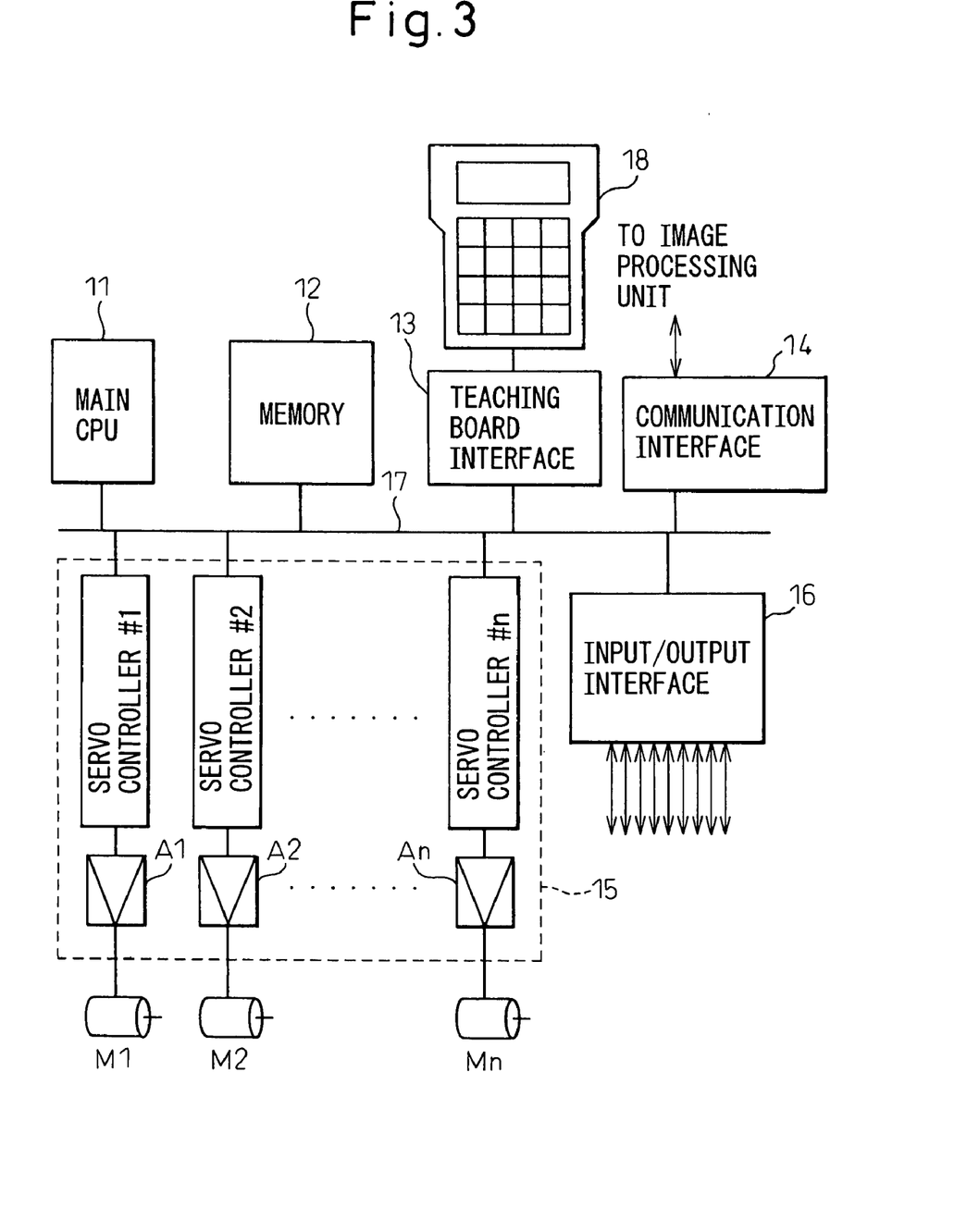
FIG. 3 is a block configuration diagram of a robot controller used in the embodiment.

FIG. 3 shows a block configuration of the robot controller 5. The robot controller 5 has a main CPU (a main central processing unit; hereinafter, simply referred to as a CPU) 11, a memory 12 including a RAM (random access memory), a ROM (read-only memory) and a non-volatile memory, a teaching board interface 13, a communication interface 14, a servo control unit 15 and an input/output interface 16 for external units, which are connected each other in parallel via a bus 17.

A teaching board 18 connected to the teaching board interface 13 may have usual display functions. The operator prepares, corrects, and registers a motion program for the robot by manually operating the teaching board 18. The operator also sets various parameters, operates the robot based on the taught motion program, and jog feeds, in the manual mode. A system program, for supporting the basic function of the robot and the robot controller, is stored in the ROM of the memory 12. The motion program of the robot taught according to the application and relevant set data are stored in the non-volatile memory of the memory 12. Also, a program and parameters used to carry out processes (for movement of the robot to calculate mechanical parameters and for communication with the image processing unit therefor) as described below are also stored in the non-volatile memory of the memory 12.

The RAM of the memory 12 is used for a storage area to temporarily store various data processed by the CPU 11. The servo control unit 15 has servo controllers #1 to #n, where n is a total number of axes of the robot, and n is assumed to be equal to 6 in this case. The servo control unit 15 receives a shift command prepared through operations (such as a path plan preparation, and interpolation and an inverse transformation based on the plan) to control the robot. The servo control unit 15 outputs torque commands to servo amplifiers A1 to An based on the shift command and feedback signals received from pulse coders not shown belonging to the axes. The servo amplifiers A1 to An supply currents to servomotors of the respective axes based on the torque commands, whereby driving the servomotors. The communication interface 14 is connected to the image processing unit 2 (FIG. 1). The robot controller 5 exchanges commands relevant to measurement and measured data described below with the image processing unit 2 via the communication interface 14.

Figure 4:
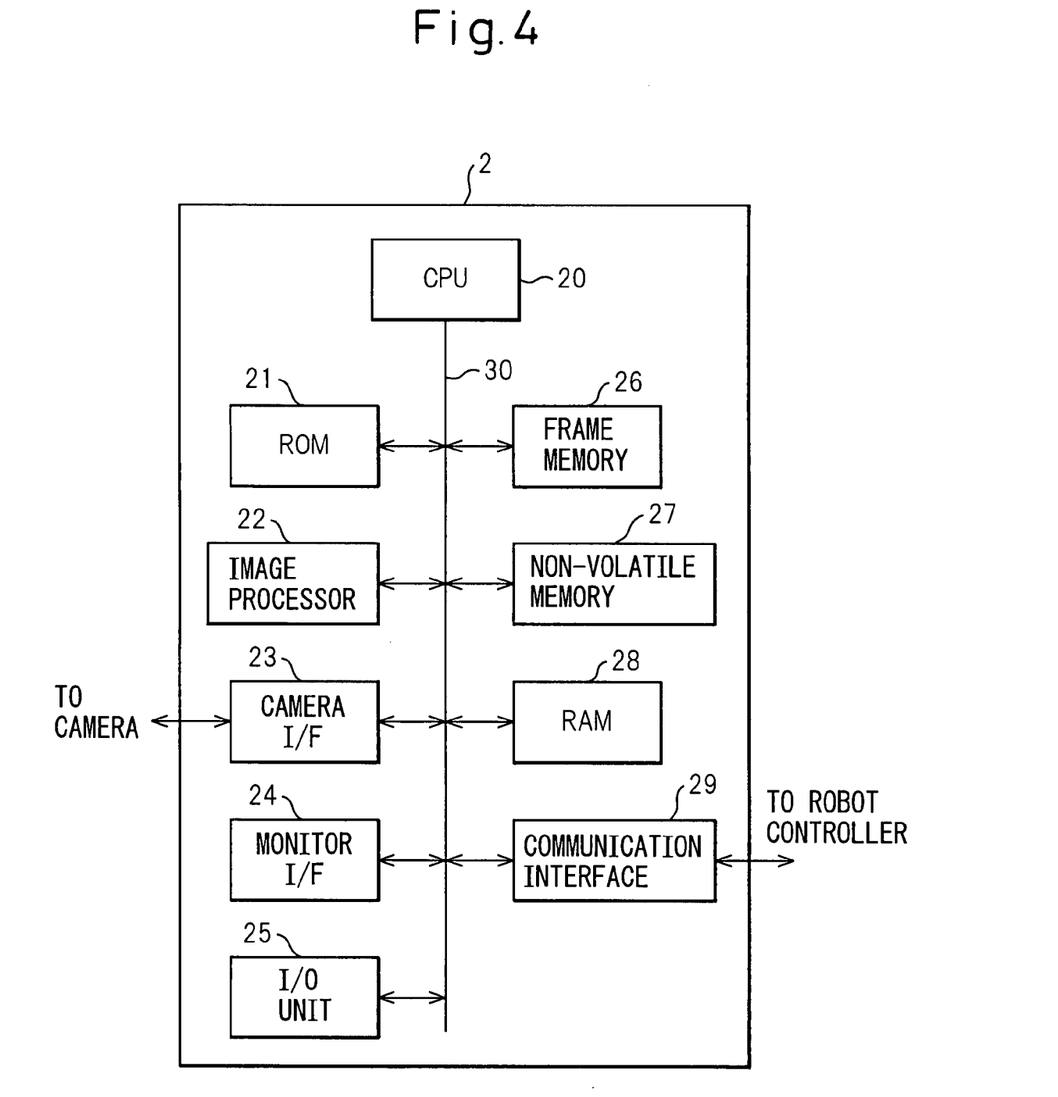
FIG. 4 is a block configuration diagram of an image processor used in the embodiment.

The image processing unit 2 has a block configuration as shown in FIG. 4. The image processing unit 2 has a CPU 20 including a microprocessor, and also has a ROM 21, an image processor 22, a camera interface 23, a monitor interface 24, an input/output (I/O) unit 25, a frame memory (i.e., an image memory) 26, a non-volatile memory 27, a RAM 28 and a communication interface 29, that are connected to the CPU 20 via a bus line 30.

A camera as an imaging unit, which is a CCD camera in this case, is connected to the camera interface 23. When the camera receives an imaging command via the camera interface 23, the camera picks up an image using an electronic shutter function incorporated in the camera. The camera sends a picked-up video signal to the frame memory 26 via the camera interface 23, and the frame memory 26 stores the video signal in the form of a grayscale signal. The monitor (FIG. 1) such as a LCD, a CRT or the like is connected to the monitor interface 24. The monitor displays images currently picked up by the camera, past images stored in the frame memory 26, or images processed by the image processor 22, as required.

As shown in FIG. 1, the camera 4 images the mark 7 on the target 6 arranged in a space represented by the robot coordinate system $\Sigma b$. The image processor 22 analyses the video signal of the image of the mark 7 stored in the frame memory 26 and, the two-dimensional position and the size of the mark is calculated, as described later in detail. A program and parameters for this purpose are stored in the non-volatile memory 27. The RAM 28 temporarily stores data used by the CPU 20 so as to execute various processing. The communication interface 29 is connected to the robot controller 5 via the communication interface 14 at the robot controller side.

FIG. 1 shows a view line 40 of the camera 4 extending from a representative point (for example a center of the light receiving surface) of the camera 4 to the target 6. A coordinate system $\Sigma v$ as shown in FIG. 1 relates to the view line 40 extending from the representative point of the camera to the target 6. The origin of the coordinate system $\Sigma v$ is positioned on the view line 40 and one axis of the coordinate system (for example, Z axis) coincides with the view line 40. As described above, the mechanical interface coordinate system $\Sigma f$ represents the position and the orientation of the tool attachment surface 32. The coordinate system $\Sigma f$ in this case also represents the position and the orientation of the robot 1. Unless otherwise noted, the expression "the position of the robot" means "the position of the origin of the mechanical interface coordinate system $\Sigma f$ on the robot coordinate system $\Sigma b$". Further, when the orientation of the robot also should be considered, the former expression means "the position and the orientation of the origin of the mechanical interface coordinate system $\Sigma f$ on the robot coordinate system $\Sigma b$".

Figure 5:
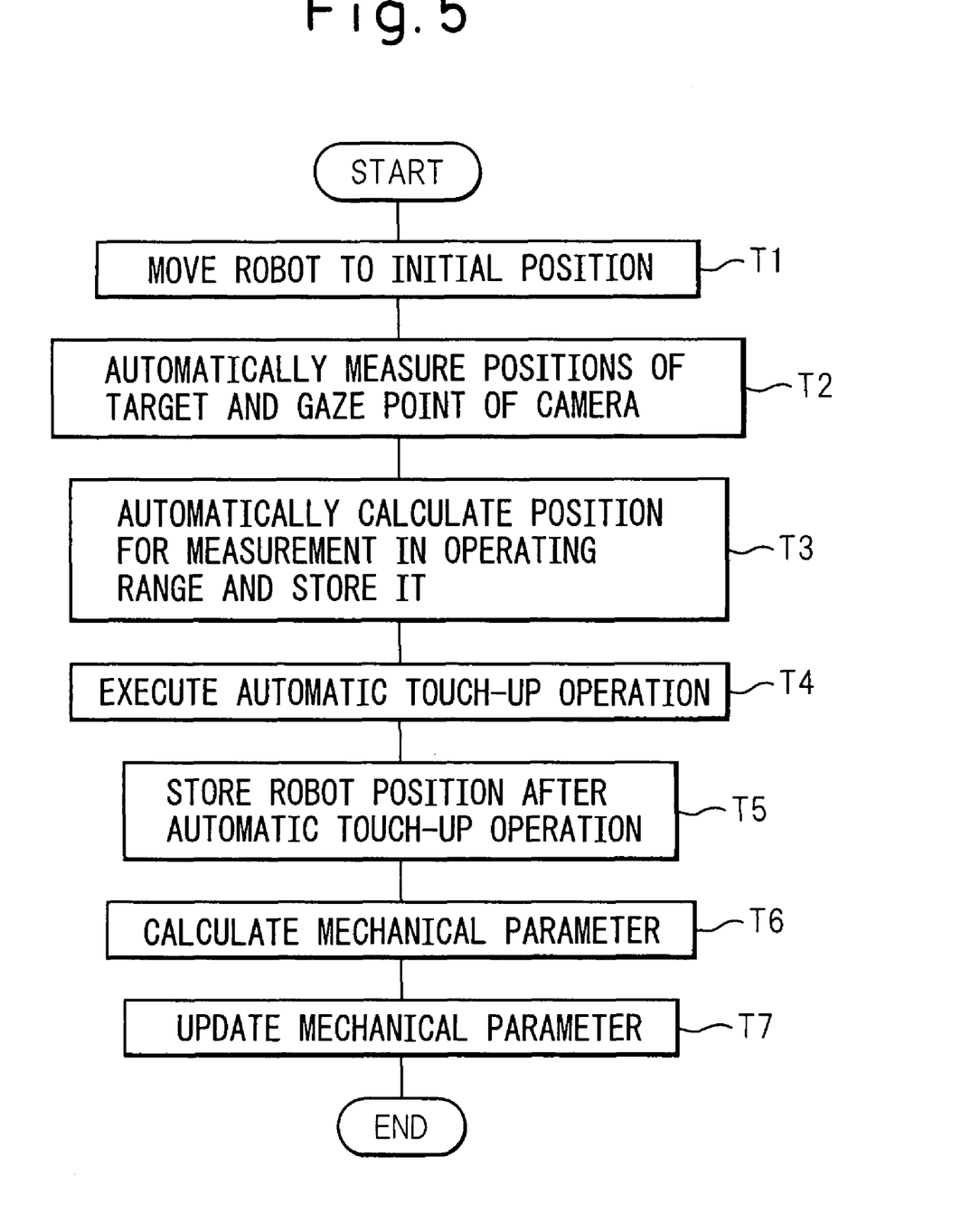
FIG. 5 is a flowchart showing an overall procedure executed in the embodiment.

Next, a procedure of calibration according to the invention by using the configuration of FIG. 1 will be described with reference to a flowchart of FIG. 5. In general, before a series of steps of the procedure are executed, the positional relationship between the robot, the target and the camera is unknown. Therefore, it is necessary to predetermine the relationship between the direction and the distance of movement of the target in the image and the direction and the distance of movement of the robot (in other words, how the robot should be moved in order to move the target in the image by a desired distance in a desired direction). For example, by moving the robot in an arbitrary direction in the coordinate system $\Sigma f$ more than once detecting the feature of the shape of the mark 7 imaged on the light receiving surface each time, the relationship between the direction and the distance of each axis of the robot and the change of the feature of the target may be calculated. Since the method for calculating the relationship regarding the direction and the distance of the robot is known, a detailed description thereof is omitted. This predetermination is finished before the below steps are executed.

Step T1

In the invention, the mark 7 of the target only has to be within the field of vision of the camera 4. In other words, it is not necessary to precisely position the camera and the target. In step T1, the operator operates the robot such that the mark 7 is within the field of vision of the camera 4 (concretely, the mark 7 is indicated in the monitor 3 of the image processing unit 2).

Step T2

In step T2, by means of the camera, the position a gaze point 31 of the camera in the mechanical interface coordinate system $\Sigma f$ and the position of a prescribed point of the mark 7 in the robot coordinate system $\Sigma b$ are automatically calculated. As a method for this purpose, for example, a method described in Japanese Unexamined Patent Publication No. 2005-201824, filed by the applicant of the present application, is preferred. In this method, the camera images the target from different directions (or in a plurality of postures of the robot), so as to align the gaze point of the camera with the prescribed point of the mark 7, whereby the position the gaze point 31 in the coordinate system $\Sigma f$ and the position of the prescribed point of the mark 7 in the coordinate system $\Sigma b$ may be calculated. This method is similar to a conventional method in which a tool center point (TCP) attached to the mechanical interface coordinate system $\Sigma f$ is mechanically "touched-up" or aligned with a prescribed point in the robot coordinate system Σb from different directions, so as to calculate the positions of the TCP and the prescribed point. Therefore, a detailed description of the method is omitted. In this step, it is not necessary to precisely calculate the positions of the camera and the target. In other words, it is sufficient to keep the target within the field of vision of the camera even when the orientation of the robot is changed around the gaze point of the camera while keeping the state in which the gaze point is aligned with the prescribed point of the target.

Step T3

Figure 6:
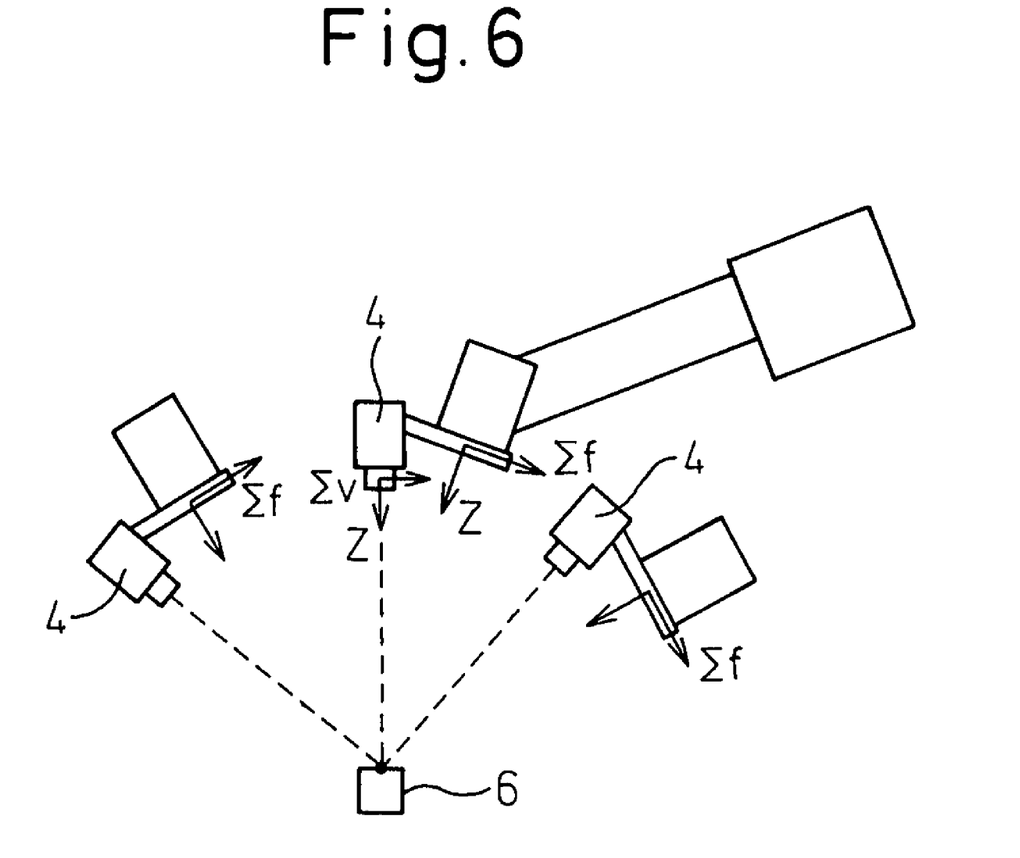
FIG. 6 is an explanatory diagram of the process of step T3 of FIG. 5.

In step T3, based on the calculated position the gaze point 31 in the coordinate system Σf and the calculated position of the prescribed point of the mark 7 in the coordinate system Σb, a plurality of sets of positions and orientations of the robot for measurement, contained in the operating range of the robot, are automatically determined or calculated and stored in the memory. In an example of the plurality of sets of positions and orientations of the robot for measurement, the distance between the camera 4 and the prescribed point (e.g., the center) of the mark 7 in each set is constant and the slope of the view line extending through the prescribed point in each set is different, otherwise, the distance between the camera 4 and the prescribed point of the mark 7 in each set is different and the slope of the view line extending through the prescribed point in each set is constant. FIG. 6 shows the former case, i.e., in which the distance between the camera 4 and the prescribed point of the mark 7 in each of three sets of positions and orientations is constant and the slope of the view line extending through the prescribed point in each set is different.

At this point, in a concrete method for automatically calculating the position and the orientation for measurement, first, the position/orientation of the robot, obtained by aligning the gaze point 31 of the camera with the prescribed point on the target 7 in step T2, is set as a reference position/orientation, and then, a specified value is added to the posture angle of the camera while keeping the position of the gaze point of the camera constant, so as to automatically generate the plurality of sets of positions and orientations for measurement within the operating range of the robot. Otherwise, another method may be possible, in which a possible range of the posture angle of the camera within the operating range of the robot is calculated, while keeping the position of the gaze point of the camera constant, and the plurality of sets of positions and orientations for measurement are generated in relation to some posture angles of the camera within the possible range (e.g., by equally dividing the possible range into some angles).

Steps T4 and T5

In step T4, "automatic touch-up operation" as described below is executed from each start point or each position/orientation determined and stored in step T3, so as to move the robot such that the feature of the mark 7 imaged on the light receiving surface satisfies a predetermined condition. Then, the position of the robot after the movement (or at each terminal point) is stored in the memory in step T5. In other words, a plurality of sets of position/orientation at the terminal points are stored in the memory, corresponding to the plurality of sets of position/orientation at the start points.

At this point, the automatic touch-up operation in step T4 is explained with reference to FIGS. 7 to 9. The calibration in the invention is based on the movement of the robot such that one or more values or one or more parameters representing the geometrical feature of the mark 7 imaged on the light receiving surface satisfies the predetermined condition in relation to a plurality of positions of the robot. In general, when a camera is used for measurement, preliminary work or camera calibration is carried out. Therefore, the accuracy of measurement depends on the accuracy of the camera calibration. In the invention, by generating a relatively small image of the mark 7 on the light receiving surface and moving the robot such that the feature of the image of the mark 7 satisfies the predetermined condition, the camera calibration is unnecessary. In an embodiment as described below, a circle with cross lines marking the center of the circle is used as the mark 7. In this case, the geometrical feature includes the position of the center and the diameter of the circle.

First, at one position/orientation for measurement of the robot, the robot is moved such that the feature of the mark 7 imaged on the light receiving surface of the camera 4 satisfies the predetermined condition. In this case, the mark 7 is constituted by a circle with cross lines marking the center of the circle, as shown in FIG. 1. The feature of an image 7a of the mark 7 on the light receiving surface includes the position of the center and the length of a log axis of an ellipse, as shown in FIGS. 7 and 8. Since the mark 7 is not opposed to the light receiving surface face to face in many cases, the shape of the image 7a becomes the ellipse. FIGS. 7 and 8 show the process for moving the center of the ellipse to a certain point (in this case, the center point M of the light receiving surface) and aligning the ellipse such that the length of the long axis of the ellipse coincide with a certain value (in this case, the diameter of the mark 7). FIGS. 7 and 8 also show the change of the positional relationship between the camera 4 and the target 6. FIG. 7 shows the state in which the ellipse 7 is offset from the point M and the length of the long axis of the ellipse is smaller than the diameter of the mark 7. FIG. 8 shows the state in which the positional relationship between the camera 4 and the target 6 is changed by moving the robot 1 such that the center of the ellipse is aligned with the point M and the length of the long axis of the ellipse coincides with the diameter of the mark 7. Concretely, by automatically executing the above process, the difference between the centers of the ellipse and the circle, and the difference between the long axis of the ellipse and the diameter of the circle are within a certain error range. On the light receiving surface, the feature value of the ellipse may be detected by image processing (a detail of which is omitted, since various known method may be used for image processing), whereby the difference between the feature value and the predetermined value may be calculated.

Figure 9:
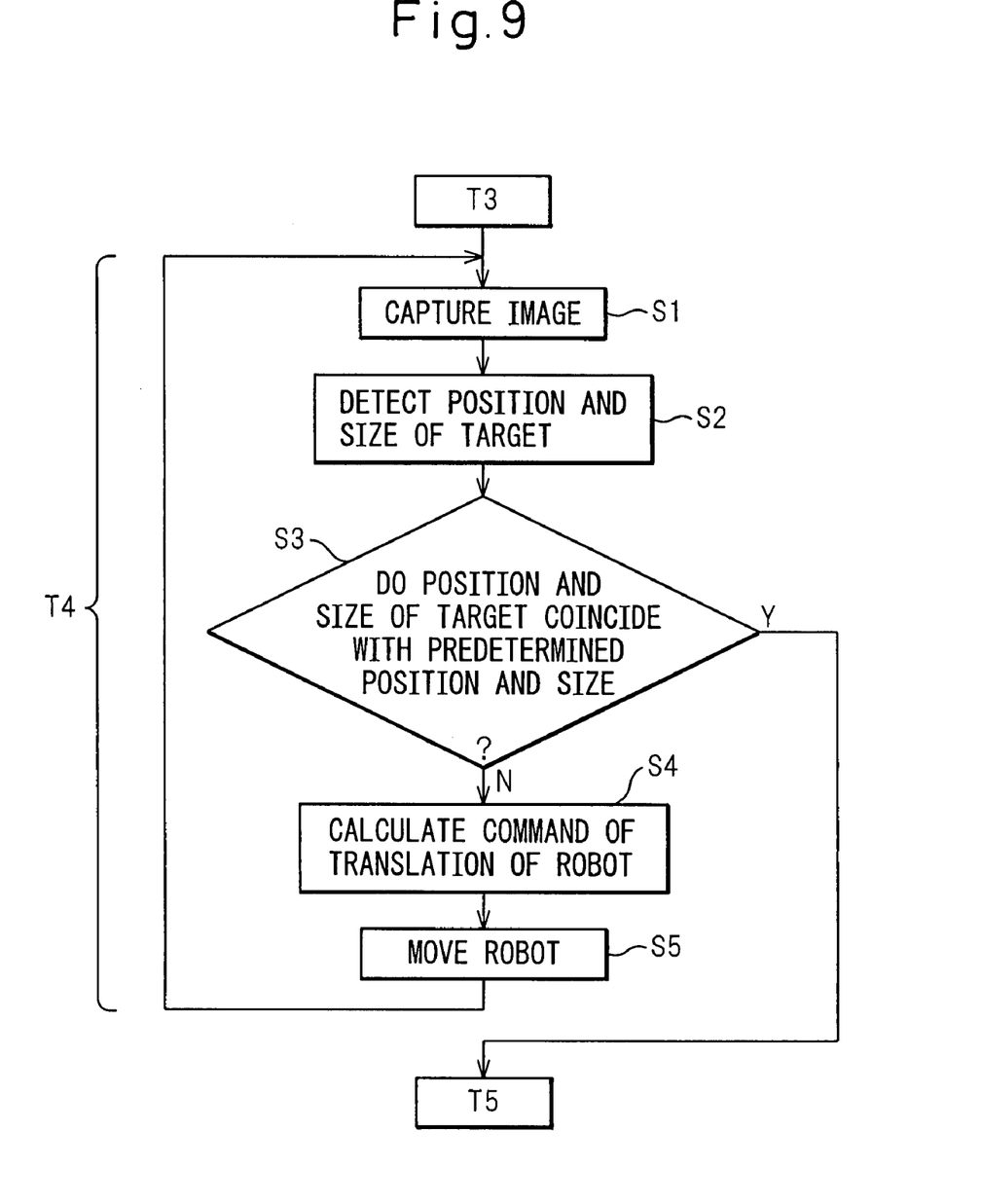
FIG. 9 is an explanatory diagram of the process of step T4 of FIG. 5.

FIG. 9 shows a flowchart indicating a detail of step T4, i.e., the process for moving the image 7a of the mark 7 imaged by the camera 4 to the predetermined point M and adjusting the size of the image 7a on the monitor 3 to the predetermined size. A point of each step of FIG. 9 is explained below.

Step S1

Figure 7:
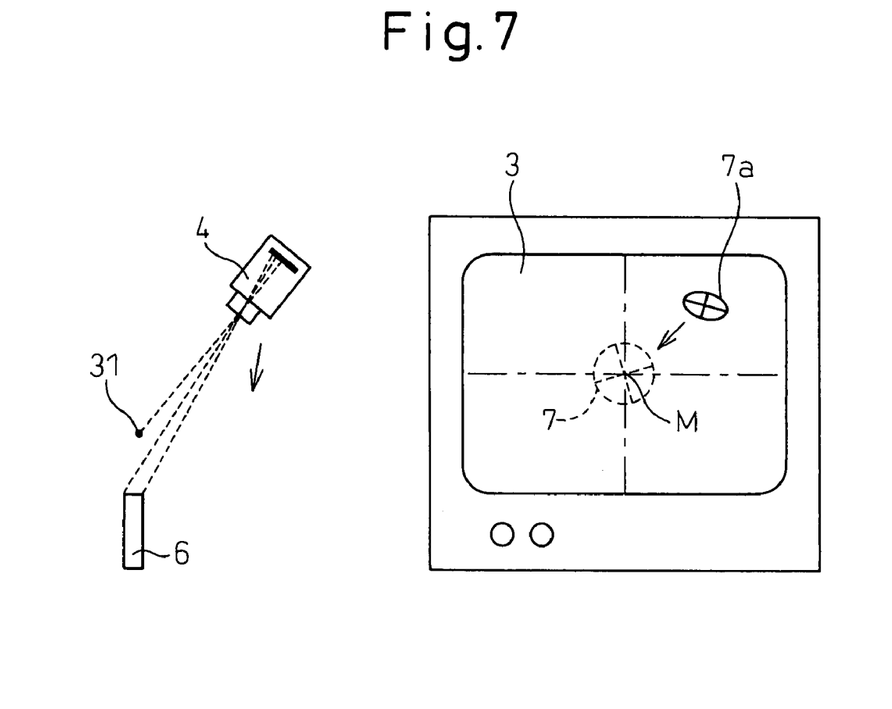
FIG. 7 is a diagram showing a monitor and the positional relationship between a camera and a target.
Figure 8:
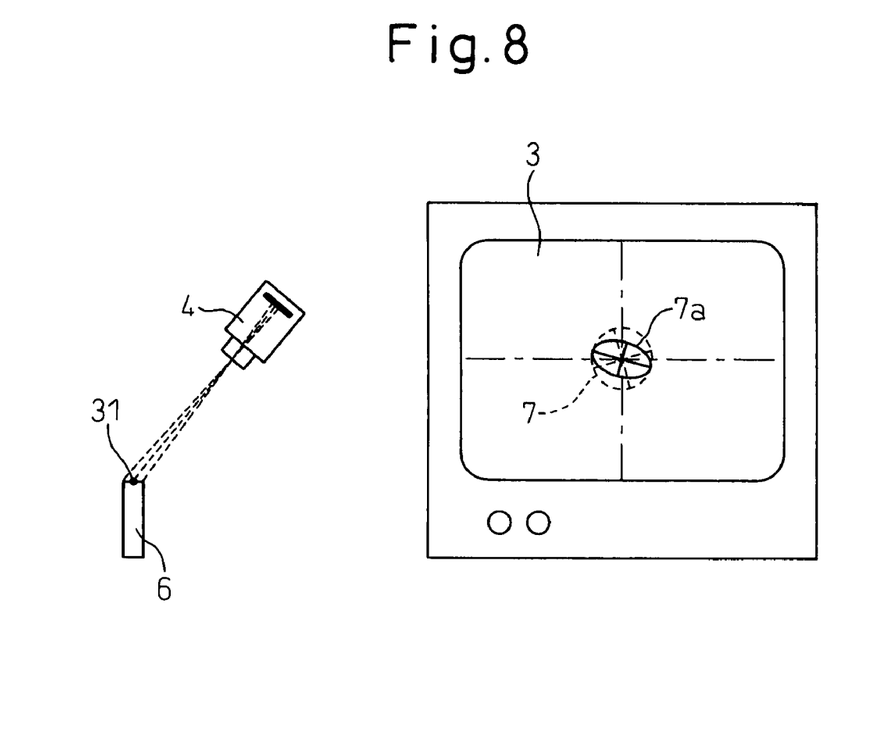
FIG. 8 is a diagram showing the state in which the target is aligned to a certain position from the position of FIG. 7.

An image of the mark 7 is captured by the camera so as to obtain the image 7a as shown in FIG. 7.

Step S2

The position and the size of the image 7a on the monitor (for example, the position of the center and the length of the long axis of the image 7a on the monitor) are detected by the image processing unit 2.

Step S3

It is judged whether the position and the size detected in step S2 respectively coincide with the predetermined position and size (in this case, the center point M on the light receiving surface and the diameter of the mark 7). Concretely, an error on the monitor or a threshold of distance δimage is predetermined. If the distance between the point M and the center of the image 7a, and the difference between the lengths of the long axis of the image 7a and the diameter of the mark 7 are both equal to or smaller than the threshold δimage, this situation is judged as "coincidence" and the process is stopped.

On the other hand, if at least one of the distance and the difference is larger than the threshold, that situation is judged as "discordance" and the process progresses to step S4. The distance on the monitor may be calculated, for example, by counting a number of square picture elements.

Step S4

A command of translation of robot, for moving the image 7a of the target 7 on the monitor to the point M and adjusting the length of the long axis of the image 7a to the predetermined value, is prepared. In this case, the command of translation means a command of movement for moving the robot such that the orientation of the robot or the orientation in the coordinate system Σf is fixed relative to the robot coordinate system Σb.

Step S5

The robot 1 is moved based on the command of translation prepared in step S4. The process is returned to step S1 after the movement of the robot. A cycle of steps described above is repeated until the judgment in step S2 become "coincide".

By the above procedure, the robot is moved such that the geometrical feature value of the image 7a on the monitor satisfies the predetermined condition. As shown in FIG. 8, when the geometrical feature value satisfies the predetermined condition, the center of the circle is positioned on the view line 40 passing through the center of the light receiving surface, and further, the position of the camera relative to the center of the circle is a constant. However, the directions of the long and short axes of the ellipse and the ratio of the axes may be different, depending on the orientation of the camera relative to the target. At this point, the gaze point 31 on the view line 40 is defined as a point intersecting with the center of the light receiving surface.

Since the camera 4 is fixed to the mechanical interface Σf, the gaze point 31 is also fixed to the mechanical interface Σf. In other words, one operation for moving the center of the imaged ellipse to the center of the light receiving device and adjusting the length of the long axis of the ellipse to the predetermined value, and another operation for matching the gaze point 31 with the prescribed point of the mark 7, both provide the same results. When the gaze point is replaced with a pin or the like, this operation for matching the gaze point is equivalent to a touch-up operation for manually adjusting the position of the robot with the pin attached to the front end of the robot. Hereinafter, this operation is referred as a "touch-up operation". In this embodiment, the geometrical feature value of the mark 7 imaged on the light receiving surface is the position of the center and the length of the long axis of the ellipse. However, other features, such as an angle formed by two straight lines constituting the cross line and/or the ratio of the long and short axes of the ellipse, may be used as the geometrical feature. In this case, the calculated command of movement of the robot in step S4 includes the change of the orientation of the robot, as well as the translation of the robot. Further, the gaze point is not limited to one specified point, and may be an arbitrary point on a certain view line.

Step T6

In this step, mechanical parameters of the robot are determined by identifying calculation using the plurality of robot positions stored in step T5 when the "automatic touch-up operation" is completed. The mechanical parameters, to be corrected in the invention, include parameters contained in a relational expression used for controlling the robot, for determining the correlation between the displacement of each drive axis of the robot (or an input) and the position of the front end of the robot (or an output). The representative parameter is the length of each link or the position of the origin of each axis. Otherwise, a backlash generated due to the rotation of the axis, the amount of elastic deformation of the link or a reducer may be possible. In the invention, the mechanical parameter determined by identifying calculation is not limited to a specified one, in other words, the possible parameter is one which can be formulated and is independent from other parameters.

Next, on the assumption that the gaze point 31 of the camera 4 coincides with the prescribed point of the mark 7 at all positions and orientations for measurement, a method for calculating the mechanical parameter of the robot is explained. At this point, errors of the mechanical parameters, for identifying calculation of errors of $n_p$-number of mechanical parameters $P_{k,0}=[P_{k,0,1}, P_{k,0,2}, \ldots, P_{k,0,np}]$, errors of the position of the gaze point 31 $P_s=[X_s, Y_s, Z_s]$ on Σf and errors of the position of the prescribed point of the mark 7 $P_m=[X_m, Y_m, Z_m]$ on Σb, are defined as $P_{ID}=[\Delta P_k, \Delta P_s, \Delta P_m]$. In an ideal condition (i.e., all components of $P_{ID}$ are equal to zero), the position $P_i$ of the gaze point 31, calculated by the position $P_s$ of the gaze point 31 on Σf and the position of the robot when the automatic touch-up operation is finished corresponding to stored i-th position/orientation for measurement, definitely coincides with the position $P_m$ of the prescribed point of the mark 7 on Σb. In effect, however, errors $e_i$ are generated between the positions $P_i$ and $P_m$, due to the error $P_{ID}$ including the error of the mechanical parameter, as shown in equation (1) below.

$$e_i = P_i - P_m \quad (1)$$

As will be understood from the geometrical relationship, when the value of each axis is assumed to be constant, the value $P_i$ is represented as a function of the value $P_{ID}$. Accordingly, the error $e_i$ is also a function of the value $P_{ID}$.

In the embodiment, by using a Newton-Raphson method, an optimum $P_{ID}$ is calculated such that an error $E=[e_1, e_2, \ldots, e_{1ns}]$, between the position $P_i$ of the gaze point 31 on Σb at $n_s$-number of position/orientation for measurement and the position $P_m$ of the prescribed point of the mark 7 on Σb, is minimized. In this calculation, as shown in equation (2), a differential value $g_{i,j}$ corresponding to a j-th identifying parameter $P_{ID,j}$ of the error $e_i$ is calculated.

$$g_{i,j} = de_i/dP_{ID,j} = (e'_{i,j} - e_i)/\Delta P_{ID,j} \quad (2)$$

At this point, the value $e'_{i,j}$ is an error, when a minute error value $\Delta P_{ID,j}$ is added to the value $P_{ID,j}$, between the position $P'_i$ of the gaze point 31 on Σb at i-th position/orientation for measurement and the position $P_m$ of the prescribed point of the mark 7 on Σb.

By using equation (2), the calculated $g_{i,j}$ may be represented as a matrix [G], as shown in equation (3).

$$[G] = \begin{vmatrix} g^T_{1,1} & \cdots & g^T_{1,j} & \cdots & g^T_{1,ne} \\ \vdots & & \vdots & & \vdots \\ g^T_{i,1} & \cdots & g^T_{i,j} & \cdots & g^T_{i,ne} \\ \vdots & & \vdots & & \vdots \\ g^T_{ns,1} & \cdots & g^T_{ns,j} & \cdots & g^T_{ns,ne} \end{vmatrix} \quad (3)$$

By using the matrix [G], the relation of error may be represented by equation (4).

$$E^T = [G] P^T_{ID} \quad (4)$$

Therefore, the value $P_{ID}$ may be calculated by equation (5).

$$P^T_{ID} = [G]^+ E^T \quad (5)$$

At this point, $[G]^+$ is a pseudo inverse matrix of the matrix [G] and calculated by equation (6).

$$[G]^+ = ([G]^T [G])^{-1} [G]^{+T} \quad (6)$$

By the above equations, the mechanical parameters $P_{k,1}$ may be calculated by equation (7).

$$[P_{k,1}, P_{s,1}, P_{m,1}] = [P_{k,0}, P_{s,0}, P_{m,0}] + P_{ID} \quad (7)$$

Since the values $P_{ID}$ and $P_i$ have a nonlinear relationship, the value $P_{k,1}$ calculated by equation (7) still includes an error. Therefore, based on the Newton-Paphson method, equations (1) to (7) are repeated until all components of $P_{ID}$ become minimal values, by using the value $[P_{k,1}, P_{s,1}, P_{m,1}]$ instead of the value $[P_{k,0}, P_{s,0}, P_{m,0}]$. In effect, the above equations are repeated until each component of $P_{ID}$ is equal to or lower than a predetermined threshold. As another calculation method used for calibration, an optimization approach for nonlinear problem, such as a genetic algorithm method or a neural network, may be possible, the details of which are omitted since these approaches are known.

Step T7

In step T7, the prior mechanical parameters of the robot stored in the robot controller is overwritten with the calculated mechanical parameters, so as to reflect the calculated parameters in the robot control.

In the embodiment, the shape of the mark of the target is a circle, however, another shape or characters may be used. When the circular shape is used, the shape of the image of the mark captured by the camera becomes the ellipse, regardless of the direction of the view line of the camera. Therefore, the arithmetic process in this case may be somewhat simplified. In addition, although the light receiving device is a CCD camera for capturing a two-dimensional image, another device having the equivalent function, such as a CMOS camera, may also be used.

The target 6 may be replaced with a point light source such as a light emitting device. In this case, a two dimensional position sensitive detector (PSD), capable of calculating a position of a center of gravity of a distribution of received light, may be used as the light receiving device. When the PSD is used, however, the image processing unit 2 is replaced with another suitable device. For example, when the PSD is used, a processing unit, capable of calculating the position of the center of gravity of the distribution of received light by processing a signal outputted from the PSD, may be used.

Figure 10:
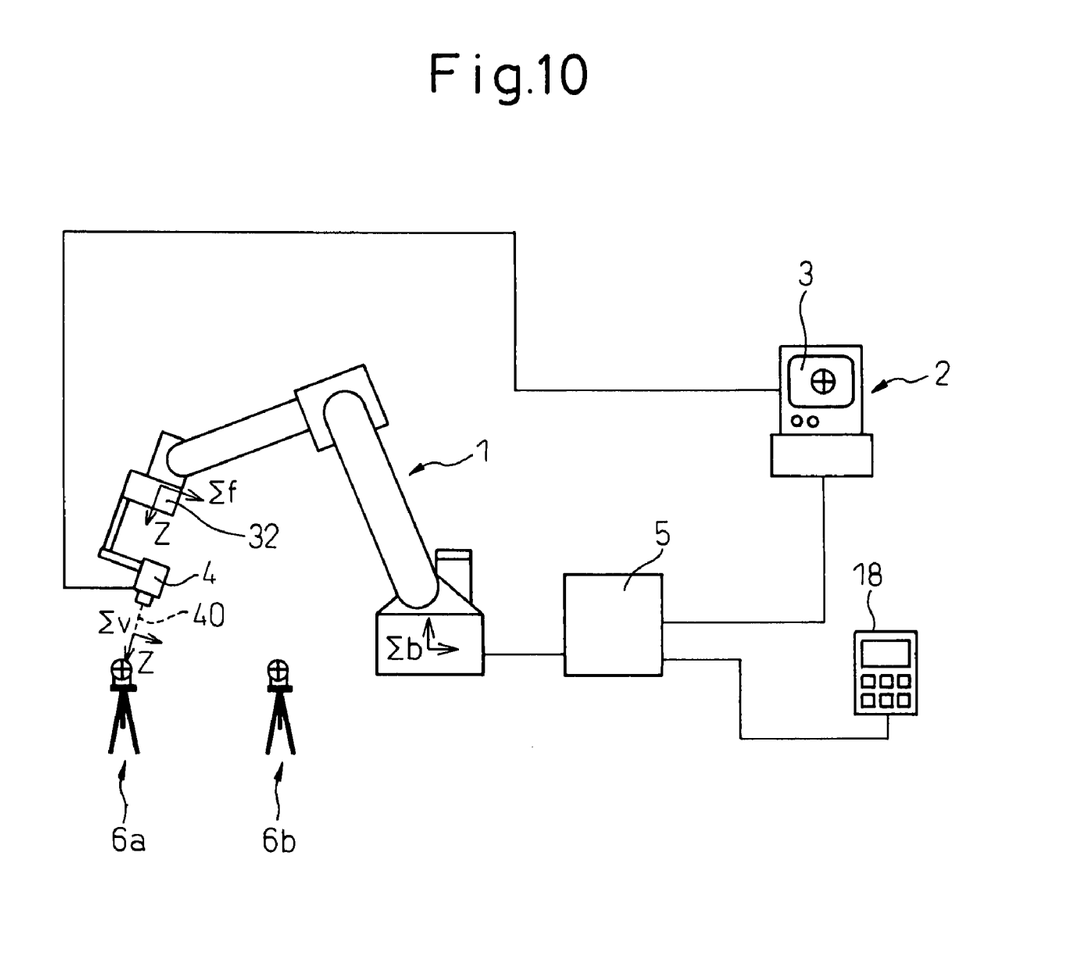
FIG. 10 is a diagram showing a schematic configuration of another embodiment according to the present invention.

Since the above procedure for calibration is one example of the invention, the procedure may be arranged depending on the configuration of the measurement system. For example, in effect, it may be difficult to uniformly formulate the error of the robot. In other words, it may be difficult to effectively formulate the error over all operating range of the robot. Accordingly, in order to improve the accuracy of the calibration over all operating range of the robot, a plurality of targets may be arranged, as shown in FIG. 10, so as to carry out the measurement more than once. In FIG. 10, two targets 6a and 6b are arranged in the robot coordinate system. In the measurement procedure in this case, the teaching operation is executed by the operator such that each target is within the field of vision of the camera (step T1 of FIG. 5). Next, a series of process from step T2 to T5 is repeated twice, and then steps T6 and T7 are executed. In addition, the accuracy of one measurement operation may be improved, by arranging a plurality of cameras in relation to one target.

According to the present invention, when the calibration is carried out by using the robot, the operation for measurement is automatically executed by means of a non-contact type light receiving device such as a camera. Therefore, a highly accurate measurement may be taken, by setting more positions and orientations for measurement by the robot, while the workload of the operator may be reduced. Further, the three-dimensional measurement may be achieved by using a two-dimensional measurement device, whereby more information may be obtained in each measurement operation. As a result, the measurement with high accuracy may be executed, in a wider operating range, independently of the skill of the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A measuring system having a light receiving device and a multi-jointed robot configured such that the light receiving device is capable of moving relative to a target to be measured, the measuring system comprising:
a measurement position/orientation determining means for determining a plurality of sets of positions and orientations of the robot in which the target is captured in a field of vision of the light receiving device;
a positioning means for sequentially positioning the robot at each position and orientation determined by the measurement position/orientation determining means;
a target detecting means for detecting a mark having a geometrical feature arranged on the target, imaged on a light receiving surface of the light receiving device, the geometrical feature being used to determine information representing the position of the image of the target on the light receiving surface and distance between the light receiving device and the target;
a robot moving means for moving the robot, from a start point of each position and orientation of the robot determined by the determining means, such that the distance between the position of the mark and one predetermined position on the light receiving surface of the light receiving device is within a certain error range, and such that the difference between the length of the mark and a certain value is within a certain error range;
a terminal point storing means for storing the position and the orientation of the robot after the robot is moved by the robot moving means, as a terminal point associated with each start point; and
a calculating means for calculating errors of mechanical parameters of the robot based on the position and the orientation of the robot at each terminal point stored in the terminal point storing means.

2. The measuring system as set forth in claim 1, wherein the measurement position/orientation determining means determines a plurality of sets of positions and orientations such that each distance between the light receiving device and a predetermined point of the target in each of the plurality of sets is constant and the orientation of each view line of the light receiving device extending through the predetermined point of the target in each of the plurality of sets is different from each other.

3. The measuring system as set forth in claim 1, wherein the measurement position/orientation determining means determines a plurality of sets of positions and orientations, such that the orientation of each view line of the light receiving device extending through the predetermined point of the target in each of the plurality of sets is constant and each distance between the light receiving device and a predetermined point of the target in each of the plurality of sets is different from each other.

4. The measuring system as set forth in claim 3, wherein the measurement position/orientation determining means automatically determines the plurality of sets of positions and orientations of the robot.

5. The measuring system as set forth in claim 1, wherein a plurality of targets are arranged.

6. The measuring system as set forth in claim 1, wherein the measuring system comprises a plurality of light receiving devices.

7. The measuring system as set forth in claim 1, wherein the calculating means calculates the errors of the mechanical parameters of the robot by using a nonlinear optimization method including a Newton-Raphson method, a genetic algorithm method and a neural network.

8. The measuring system as set forth in claim 1, wherein the light receiving device is a CCD camera for obtaining a two-dimensional image.

9. The measuring system as set forth in claim 1, wherein the calculating means calculates the errors of mechanical parameters of the robot based on the difference between the position of a gaze point of the light receiving device and the position of a certain point of the mark on the target.

10. The measuring system as set forth in claim 1, wherein the target has a circular shape and the information includes the length of a long axis of an ellipse imaged on the light receiving surface of the light receiving device.

11. The measuring system as set forth in claim 1, wherein the light receiving device is a position sensitive detector for calculating the center of gravity of the distribution of the amount of received light of the light receiving device.

12. The measuring system as set forth in claim 11, wherein the target is a light emitting body.

13. A calibration method of a multi-jointed robot by using a measuring system having a light receiving device and a multi-jointed robot configured such that the light receiving device is capable of moving relative to a target to be measured, the calibration method comprising the steps of:
   determining a plurality of sets of positions and orientations of the robot in which the target is captured in a field of vision of the light receiving device;
   sequentially positioning the robot at each of the determined positions and orientations;
   detecting a mark having a geometrical feature arranged on the target, imaged on a light receiving surface of the light receiving device, the geometrical feature being used to determine information representing the position of the image of the target on the light receiving surface and distance between the light receiving device and the target;
   moving the robot, from a start point of determined each position and orientation of the robot, such that the distance between the position of the mark and one predetermined position on the light receiving surface of the light receiving device is within a certain error range, and such that the difference between the length of the mark and a certain value is within a certain error range;
   storing the position and the orientation of the robot after the robot is moved, as a terminal point associated with each start point; and
   calculating errors of mechanical parameters of the robot based on the position and the orientation of the robot at each of the stored terminal points.

14. The calibration method as set forth in claim 13, wherein the step of calculating includes calculating the errors of mechanical parameters of the robot based on the difference between the position of a gaze point of the light receiving device and the position of a certain point of the mark on the target.

15. The measuring system as set forth in claim 1, wherein the calculating means calculates the errors of mechanical parameters of the robot without calibrating camera parameters.

16. The calibration method as set forth in claim 13, wherein the step of calculating includes calculating the errors of mechanical parameters of the robot without calibrating camera parameters.

* * * * *